US008477354B2

(12) United States Patent
Gaertner et al.

(10) Patent No.: US 8,477,354 B2
(45) Date of Patent: Jul. 2, 2013

(54) PROVIDING PRINT OPERATIONS TO VIRTUALLY ANY CLIENT REGARDLESS OF THE COMPUTING ENVIRONMENT OF THE CLIENT

(75) Inventors: Joseph P. Gaertner, Lafayette, CO (US); Jon Meilstrup, Longmont, CO (US); Marquis G. Waller, Beverly, OH (US)

(73) Assignee: Ricoh Company, Ltd, Tokyo (JP)

( * ) Notice: Subject to any disclaimer, the term of this patent is extended or adjusted under 35 U.S.C. 154(b) by 93 days.

(21) Appl. No.: 13/032,930

(22) Filed: Feb. 23, 2011

(65) Prior Publication Data
US 2012/0212774 A1 Aug. 23, 2012

(51) Int. Cl.
*G06F 3/12* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS 6,814,510 B1 * 11/2004 Sabbagh et al. ................ 400/63

* cited by examiner

*Primary Examiner* — Eric A Rust
(74) *Attorney, Agent, or Firm* — Duft Bornsen & Fettig, LLP

(57) ABSTRACT

The systems and methods presented herein provide print operations to a client via a print application in a manner that makes the print application independently operable within a computing environment of the client. The system includes a print application initiator that is operable in the client to copy system definitions of the client that control computing sessions within the client, to retrieve print application definitions that control computing sessions for the print application, and to change one or more of the copied system definitions based on the print application definitions. The print application initiator is also operable to generate a computing session for the print application within the client based on the changed system definitions and to start the print application within the computing session to provide the print operations of a print processing device to the client.

17 Claims, 5 Drawing Sheets

PROVIDING PRINT OPERATIONS TO VIRTUALLY ANY CLIENT REGARDLESS OF THE COMPUTING ENVIRONMENT OF THE CLIENT

FIELD OF THE INVENTION

The invention relates to processing print jobs though a print shop architecture.

BACKGROUND

Larger enterprises often employ fairly complex print shop architectures to address their various printing needs. For example, members of an organization may use local printers for simple desktop publishing (e.g., letters, memorandums, pictures, etc.). However, when the organization requires more sophisticated and/or larger volume printing, the organization may employ a print shop architecture comprising a number of higher-end printers (e.g., multifunction printers, production printing systems, etc.) that are capable of providing more functionality and/or print volume.

These print shop architectures are typically managed by a print server that is operable to receive print jobs from a plurality of clients via host system devices (e.g., networked computer systems, mobile devices, etc.). The seamless integration of the printers in such an environment, however, is often difficult to implement. For example, printers and their specific capabilities may not be fully recognized by individual client devices. The print server is configured to manage the hardware and software assets of all the printers in the print shop architecture such that a user can easily identify a particular printer. In this centralized print environment, system administrators and other information technology personnel can also access and control the features of the printers.

Typically, the print server is configured with a plurality of features and protocols of the various printers controlled by the print server. For example, each printer managed by the print server may have its own print capabilities (e.g., double-sided printing, stapling, collation, etc.) and/or print protocols (Hot Folder, Job Definition Format or "JDF", Job Messaging Format or "JMF", line printer or "LPR"), that differ from other printers in the print shop architecture. Before such centralized management, a client device would install a printer driver that included the printing capabilities of the printer. The printer driver also establishes the print protocol for the client device to communicate with and control the printer. The print server maintains the printer drivers for the physical printer.

The print server presents this functionality to the client device such that a user may print a document to a particular physical printer. For example, when a user wishes to print a document to a particular physical printer, the user may access a print application via a client to establish a session for communicating with the print server to access that physical printer. However, print application software may not be compatible with every system. For example, a Linux-based print application may be operable within a Linux-based client to provide print operations from a Linux-based print server. However, there is no current means for providing the Linux-based print application within another operating system environment, such as Microsoft Windows.

SUMMARY

Embodiments herein provide print operations to a client via a print application in a manner that makes the print application independently operable within a computing environment of the client. In other words, the print application provides print operations to virtually any client regardless of the computing environment of the client. In one embodiment, a system includes the print application and a print application initiator operable in the client to copy system definitions of the client that control computing sessions within the client, to retrieve print application definitions that control computing sessions for the print application, and to change one or more of the copied system definitions based on the print application definitions. The print application initiator is also operable to generate a computing session for the print application within the client based on the changed system definitions and to start the print application within the computing session to provide the print operations of a print processing device to the client.

The computing session may be operable within an operating system of the client that differs from an operating system of the print processing device. In this regard, the computer session may modify its own environment in the client without changing the system-wide environment definitions of the client. The print application may be operable to interface with a virtual printer of the print processing device to provide the print capabilities to the client. The print application may interface with the virtual printer via a Hot Folder, a Line Printer (LPR) print protocol, a Job Messaging Format (JMF) print protocol, or a Job Definition Format (JDF) print protocol.

The various embodiments disclosed herein may be implemented in a variety of ways as a matter of design choice. For example, the embodiments may take the form of computer hardware, software, firmware, or combinations thereof. In one embodiment, a method is operable within a printing system to perform the functionality disclosed. In another embodiment, a computer readable medium is operable to store software instructions that are operable to implement the various steps of the method. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
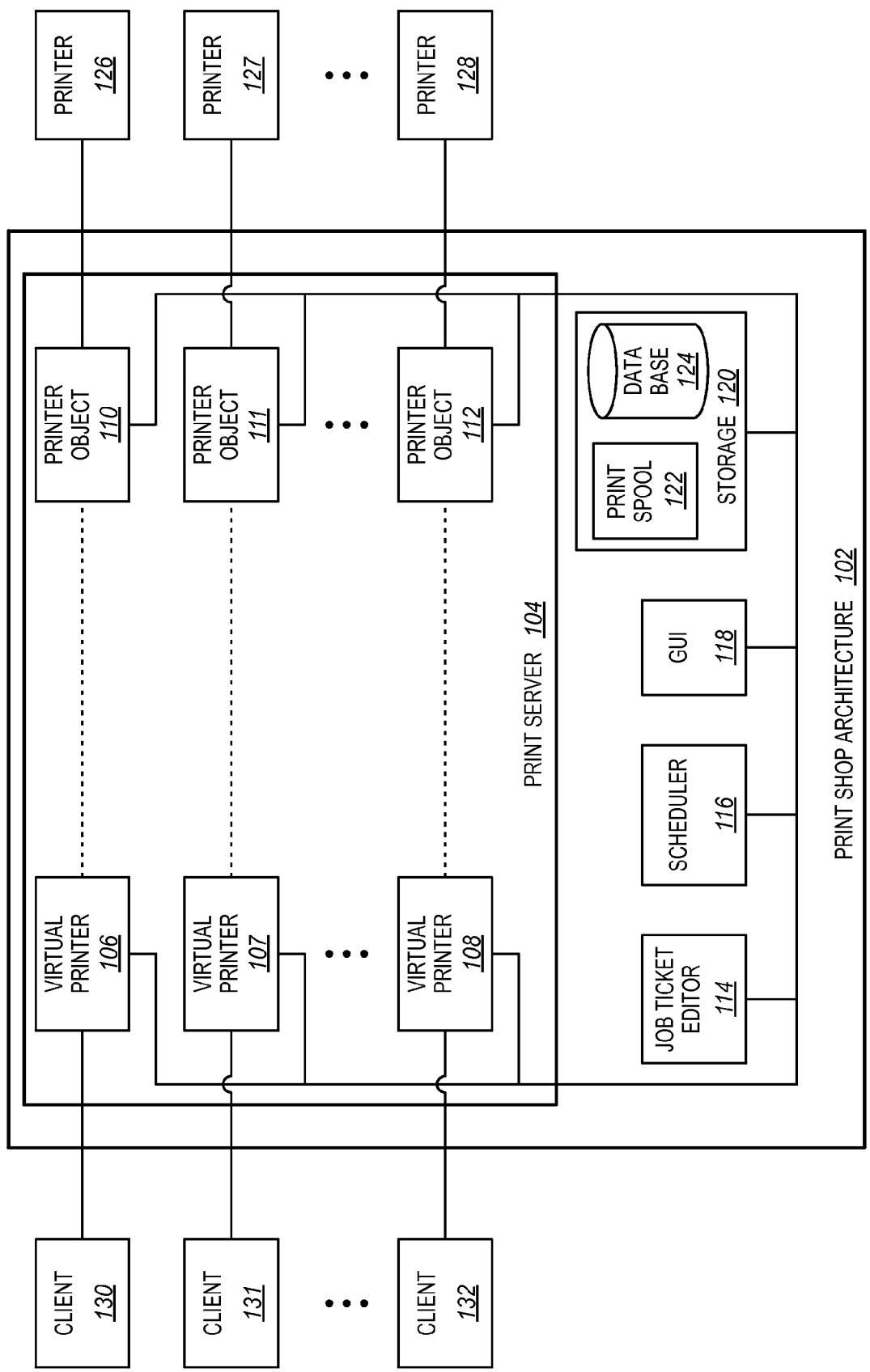
FIG. 1 is a block diagram of a print shop architecture in an exemplary embodiment.

FIG. 1 is a block diagram illustrating a print shop architecture 102 (also referred to herein as a printing system) in an exemplary embodiment. The print shop architecture 102 couples one or more clients 130-132 to one or more physical printers 126-128 to provide printing and print workflow services to the clients 130-132. The print shop architecture 102 is operable to receive print jobs and job tickets from the clients 130-132 for printing via printers 126-128. The clients 130-132 may include banks, credit card companies, or other entities that generate print jobs (e.g., monthly bank statements, monthly credit card bills, etc.) on host computer systems via software applications that interface with the print shop architecture 102. The print shop architecture 102 may receive the print jobs from the clients 130-132 in a number of different formats, such as Portable Document Format (PDF), Mixed Object: Document Content Architecture (MO:DCA), Advanced Function Printing (AFP), etc. Job tickets may be received from the clients 130-132 in a number of different formats, such as Job Definition Format (JDF), Print Production Format (PPF), Portable Job Ticket Format (PJTF), etc. A job ticket comprises print parameters that define how a print job is to be printed on the printers 126-128. The printers 126-128 generally include systems for transforming print data of the print jobs onto a suitable printable medium, such as paper, and generally are large production printing systems for high volume printing.

The print shop architecture 102 includes a print server 104 (also referred to herein as a print processing device) having one or more virtual printers 106-108. The virtual printers 106-108 are generally software modules that are operable within the print server 104 to communicate with the clients 130-132 and provide an interface to the clients 130-132 that allows the clients 130-132 to set up print jobs and send the print jobs (and job tickets associated with the print jobs) to the printers 126-128. The print shop architecture 102 also includes a corresponding plurality of printer objects 110-112. The printer objects 110-112 are similar to printer drivers in that the printer objects 110-112 comprise print capabilities of corresponding printers 126-128. The printer objects 110-112 also include system capabilities of the print shop architecture 102 (i.e., delayed printing features, expedited printing features, periodic printing features, etc.). Accordingly, each printer object generally includes all of the printing capabilities of a printer and establishes the communications and control for that printer. Typically, a 1:1:1 correspondence exists between the virtual printers, the printer objects, and the printers. That is, a virtual printer typically interfaces to one printer object and that printer object comprises the printing capabilities of one printer.

When the clients 130-132 send print jobs and job tickets to the print shop architecture 102, the job tickets are copied into a database 124 located in storage 120 of the print shop architecture 102. The print jobs and job tickets are then placed in a print spool 122 of storage 120 as open print jobs prior to queuing the print jobs for printing. A scheduler 116 identifies the open print jobs located in the print spool 122 and attempts to schedule the print jobs in queues of the printer objects 110-112. Typically, the scheduler 116 attempts to schedule the open print jobs with one of the printer objects 110-112 corresponding to the virtual printer that received the print job. For example, if the client 130 transmitted the print job to the virtual printer 106, then the scheduler 116 may first attempt to place the print job in a print queue of the printer object 110. Generally, the printer objects 110-112 interface with corresponding printers 126-128 to queue and process print jobs prior to transmitting the print jobs to the printers 126-128.

A print operator may use a Graphical User Interface (GUI) of the print shop architecture 102 to control and identify the status of print jobs in the print shop architecture 102. For example, the GUI 118 may provide a list of print jobs in queues of the printer objects 110-112 and other general information about the status of open jobs in the print spool 122. The print operator may also use a job ticket editor 114 to modify job tickets associated with both open and queued print jobs. Using job the ticket editor 114, the print operator may modify job tickets to change various print options for a print job associated with the job ticket, such as duplexing, stapling, media type, etc. The print shop architecture 102 provides a number of printing and workflow services to the clients 130-132 which will become more readily apparent through the following discussion and related figures.

Although shown and described with respect to a particular number of clients, virtual printers, physical printers, and printer objects, the invention is not intended to be so limited. The print server 104 may be operable to provide printing services to more or fewer clients and/or include more or fewer printers than shown in the exemplary embodiment.

Figure 2:
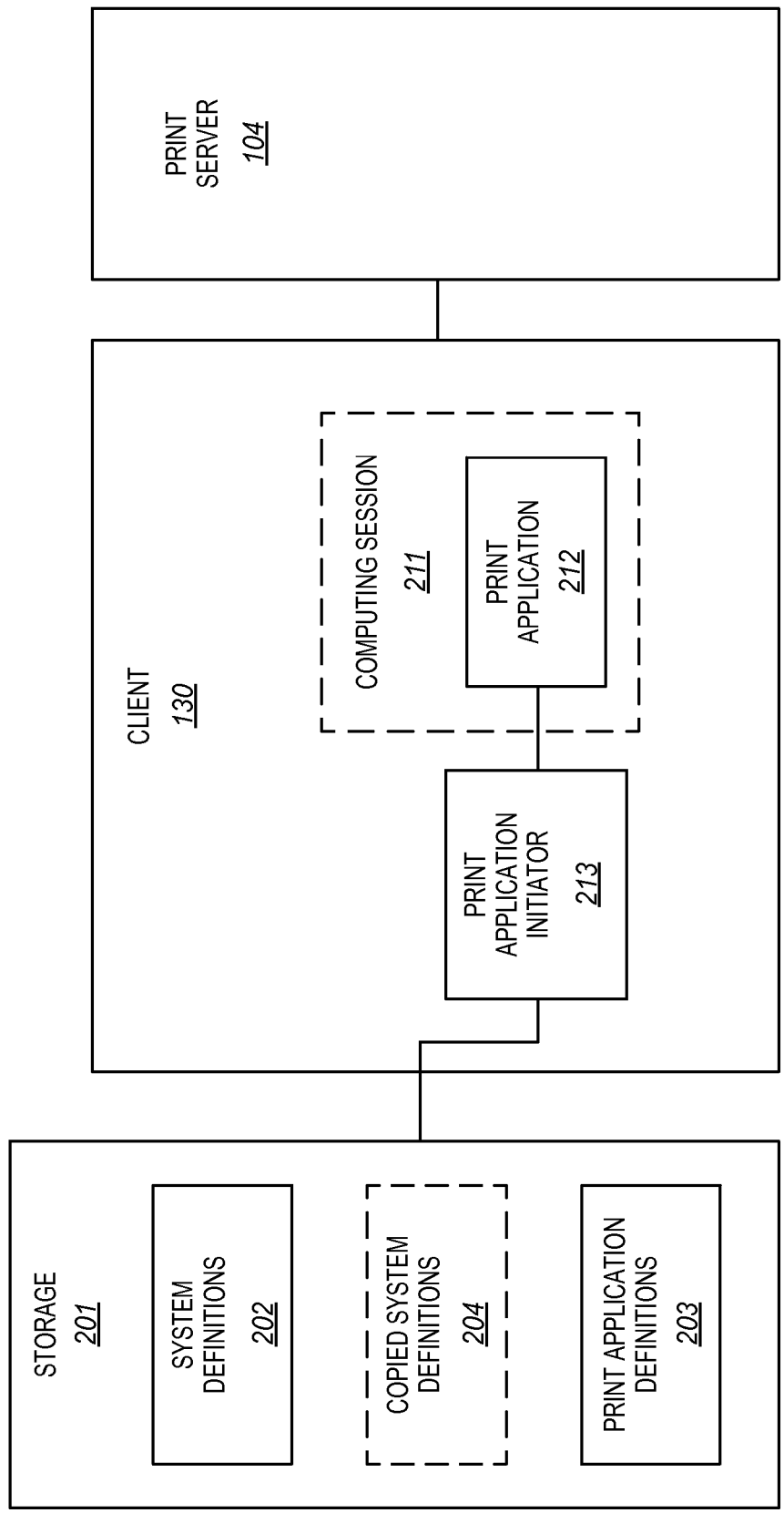
FIG. 2 is a block diagram of a client interfacing with a print server in an exemplary embodiment.

FIG. 2 is a block diagram of the client 130 interfacing with the print server 104 in an exemplary embodiment. In this embodiment, the client 130 is configured with a print application initiator 213 operable to initiate a print application 212 within a computing session 211 of the client 130. The print application 212 is operable to provide print operations of the print server 104, and the printers 126-128, to the client 130. The print application initiator 213 is any device or software that initiates the print application 212 by generating the computing session 211 via the system definitions 202 of the client 130 and the print application definitions 203. For example, the client 130 may include an operating system that uses the system definitions 202 to control computing sessions within the operating system of the client 130. Typically, once established, these system definitions 202 (often called system variables or environment variables) are not changed to ensure that the operating system of the client 130 provides preconfigured functionality as desired.

The print application definitions 203 control how the print application 212 functions within the computing session 211. For example, the print application definitions 203 may include print functionality that is operable within an operating system of the print server 104. The print application initiator 213 may use these print application definitions 203 along with the system definitions 202 to generate the computing session 211 such that the print application 212 may operate within the client 130 to provide print operations of the print server 104 to the client 130.

The system definitions 202 and the print application definitions 203 may be stored in storage 201. The storage 201 may be any device or system capable of storing digital information. For example, the storage 201 may be a computer disk drive system of the client 130 that also stores the operating system of the client 130. It should be noted, however, that the storage 201 is merely representative of storage for the system definitions 202 and the print application definitions 203 and that the two sets of definitions may not be stored together within the same storage device. For example, the print application definitions 203 may be stored in a storage device of the print server 104 accessed by the print application initiator 213. It should also be noted that the print application initiator 213 and the print application 212 may be operable within any of the clients 130-132 communicating with the print server 104.

Once the print application 212 is initiated within the computing session 211, the client 130 may communicate with the print server 104 such that print operations for the client 130 may be established (e.g., printing via one of the printers 126-128). In doing so, the client 130 may communicate with the print server 104 via a print protocol of a selected printer to prepare print jobs for printing via the selected printer. Examples of various print protocols include HotFolder, LPR, JMF, and JDF. Hot Folder provides a relatively quick way of sending image files to the printers 126-128. The Hot Folder interface displays the printers 126-128 to the clients 130-132 through user created "hot folders" that serve as drop-off points for images where printing is desired. LPR is a well-known network protocol for submitting print jobs to a remote printer. JDF is an extensible XML-based protocol built upon existing technologies of the International Cooperation for the Integration of Processes in Prepress, Press, and Postpress Organization (CIP4) Print Production Format and the Adobe Portable Job Ticket Format. JDF provides the ability to unify print aspects of print jobs and bridge communication between printers and management functionality, regardless of the tools being used. JDF works in tandem with a counterpart format, JMF. JMF provides for production components of a JDF workflow to communicate management functionality. JMF provides a series of queries and commands to elicit information about JDF print jobs and determine system capabilities of the print server 104 and/or printer capabilities of the printers 126-128.

Figure 3:
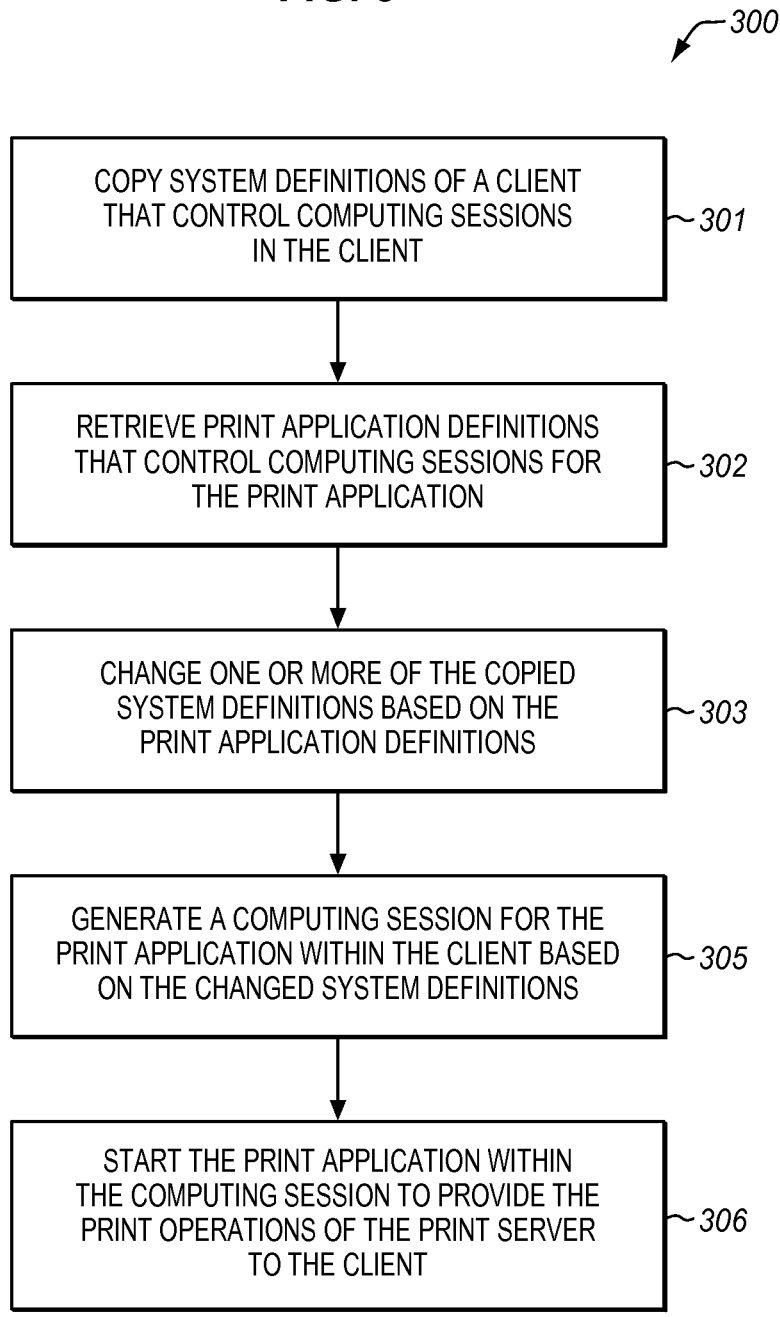
FIG. 3 is a flow chart of a method for providing print operations to the client in an exemplary embodiment.

The functionality of the print shop architecture 102, and more specifically the print application 212 and print application initiator 213 within the client system 130, will now be discussed with reference to the method 300 of FIG. 3. FIG. 3 is a flow chart of a method 300 for providing print operations to the client 130 in an exemplary embodiment. In this embodiment, when the client 130 wants to establish printing operations with the print server 104, the client 130 may launch the print application 212 to generate and transfer a print job to the print server 104 for printing via one of the printers 126-128. For example, the client 130 may be a host computer system with a graphical user interface that allows the user of the client 130 to select the print application 212 (e.g., a software application operable) to establish the print operations. However, since the print server 104 may be operating within a different computing environment than the client 130 (e.g., different operating systems), the print application 212 may be inoperable on its own with the client 130. In this regard, the print application initiator 213 may access (e.g., from the storage 201) the system definitions 202 of the client 130 that control the computing sessions within the client 130 to copy the system definitions 202 (system definitions copy 204), in the process element 301, such that the copied system definitions 204 may be changed without altering the original system definitions. In doing so, the print application initiator 213 may retrieve (e.g., from the storage 201) the print application definitions 203 that control computing sessions for the print application 212, in the process element 302, to change one or more of the copied system definitions 202 of the client 130, in the process element 303. For example, the print application definitions 203 may be operable to establish a computing session between the print application 212 and the print server 104 such that print operations may be provided. When the print application 212 is not operable within operating system environment of the client 130 with those print application definitions 203, the print application initiator 213 changes a copy 204 of the system definitions based on the print application definitions 203 (e.g., in the form of a "software wrapper") such that the print application 212 may function within the operating system of the client 130. Since only the system definition copy 204 is changed, the computing environment may still function as desired with the original system definitions 202. Once the copy 204 of the system definitions have been changed, the print application initiator 213 generates a computing session 211, in the process element 305, such that the print application initiator 213 may start the print application 212 within the computing session 211 and provide the print operations of the print server 104 to the client 130, in the process element 306. A detailed example of such is shown and described in FIG. 4.

Figure 4:
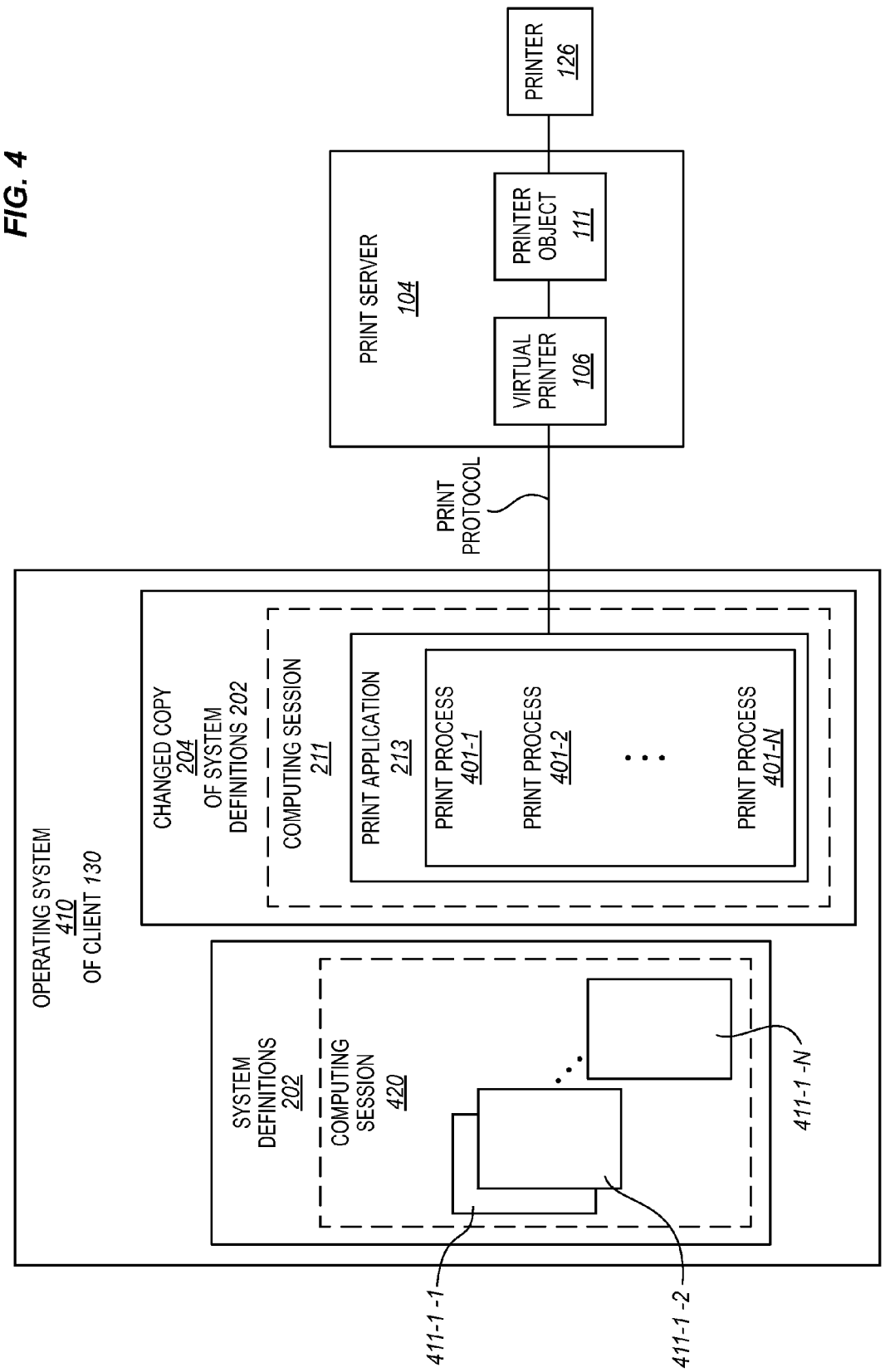
FIG. 4 is a block diagram of a print application interfacing with the print server in an exemplary embodiment.

FIG. 4 is a block diagram of the print application 213 interfacing with the print server 104 in an exemplary embodiment. In this embodiment, the client 130 is configured with an operating system 410 is operable to generate a computing session 420 for a plurality of applications 411-1-N based on the system definitions 202. For example, the operating system 410 may be a Microsoft Windows-based operating system that uses the system definitions 202 to initiate a computing session 420 for a plurality of software applications operable within the operating system (e.g., Microsoft Word, Internet Explorer, etc.). The computing session 420 uses the system definitions 202 to execute the applications 411 within the confines of the operating system 410. However, the computing session 420 and the applications 411 do not change the system definitions 202. That is, the computing environment of the operating system 410 dictates how the computing session 420 runs the applications 411 based on the system definitions 202.

The computing session 211, on the other hand, uses a changed copy 204 of the system definitions 202 to operate within the operating system 410. Thus, the computing session 211, albeit operable within the operating system 410, functions in a manner that differs from the computing session 420. In this regard, the print application initiator 213 uses the print application definitions 203 to change the copied system definitions 204 while leaving the original system definitions 202 intact. The changed copy 204 of the system definitions 202 are operable within the computing environment of the operating system 410 to provide a software wrapper for the print application 213 that would otherwise be inoperable within the operating system 410 with the original system definitions 202. Once operating within the computing session 211, the print application 213 provides print processes 401-1-N to a user of the client 130 such that the user can access print operations of the print server 104. For example, a user of the client 130 may generate a print job via the print application 213 and transfer that print job to the virtual printer 106 via print protocol of the physical printer 126. Virtual printer 106 processes the print job and transfers the print job to the printer 126 via the printer object 111 as described above.

Figure 5:
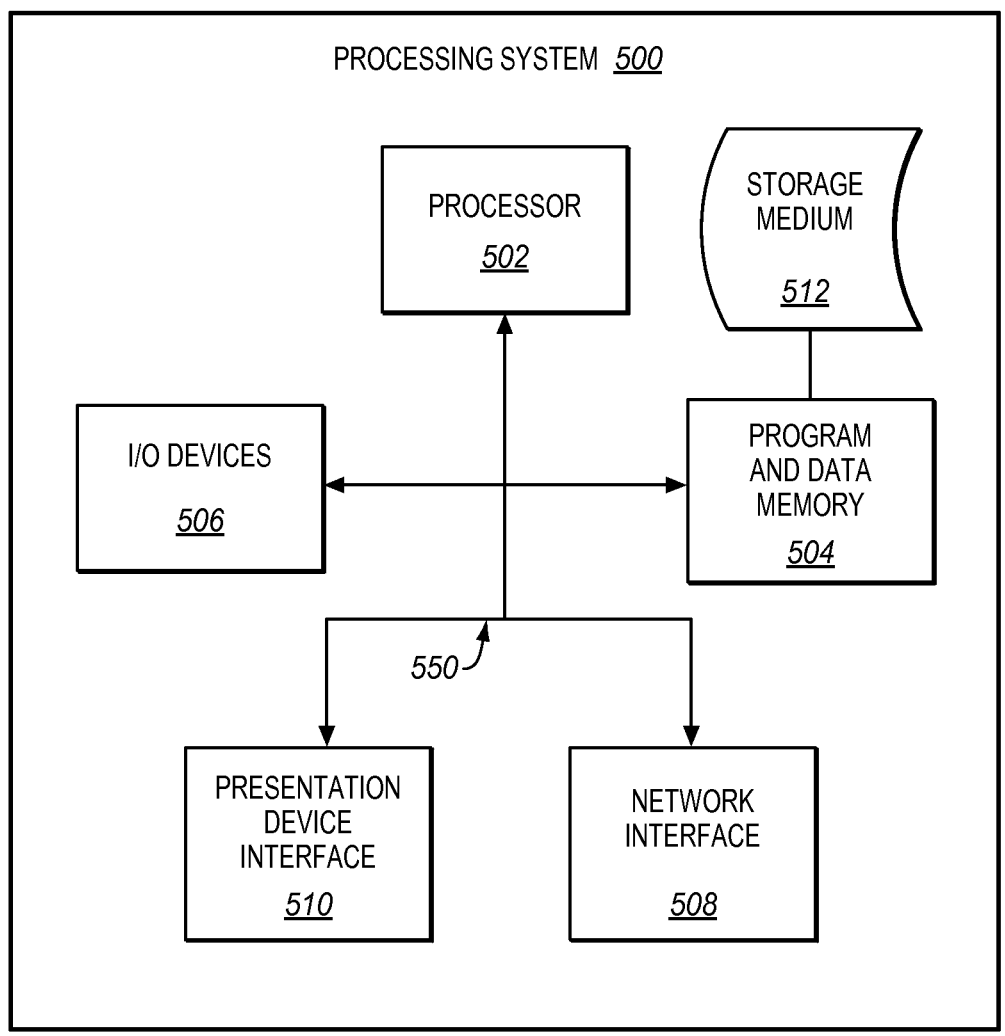
FIG. 5 illustrates an exemplary computer system operable to execute computer readable medium embodying programmed instructions to perform desired functions.

As mentioned, embodiments disclosed herein can take the form of software, hardware, firmware, or various combinations thereof. FIG. 5 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, the computer readable storage medium 512 can be anything that can contain, store, communicate, or transport the program for use by the computer.

The computer readable storage medium 512 can be an electronic, magnetic, optical, electromagnetic, infrared, or semiconductor device. Examples of the computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A processing system 500, being suitable for storing and/or executing the program code, includes at least one processor 502 coupled to memory elements 504 through a system bus 550. The memory elements 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. A presentation device interface 510 may be coupled to the system to interface to one or more presentation devices, such as printing systems and displays for presentation of presentation data generated by processor 502.

Although shown and described with respect to automated processing of print job documents, such designations are merely intended to describe the general printing, sorting, and/or inserting of the documents. Accordingly, while specific embodiments are described herein, the scope of the invention is not limited to those specific embodiments. The scope of the invention is defined by the following claims and any equivalents thereof.

We claim:

1. A system comprising:
a processor that implements an initiator compatible with an operating system of a client device, the initiator operable to copy original system definitions for the operating system, to alter one or more of the copied original system definitions, to generate a computing session for a print application within the operating system, where the altered original system definitions are used for the computing session while the original system definitions remain used for the operating system, and to initiate the print application within the computing session, and
wherein the processor further implements the print application, where the print application is operable within the generated computing session to use the altered original system definitions to facilitate communications between a print device and the client device, and
wherein the print application is operable to interface with a virtual printer of the print processing device to provide the print capabilities to the client device.

2. The system of claim 1, wherein the operating system of the client differs from an operating system of the print device.

3. The system of claim 1, wherein the print application interfaces with the virtual printer via a Hot Folder, a Line Printer (LPR) print protocol, a Job Messaging Format (JMF) print protocol, or a Job Definition Format (JDF) print protocol.

4. The system of claim 1 wherein
applications initiated in the computing session use the altered original system definitions, while applications initiated in the operating system use the original system definitions.

5. The system of claim 1 wherein
the original system definitions comprise a registry of the operating system.

6. The system of claim 1 wherein
the original system definitions comprise environment variables of the operating system.

7. The system of claim 1 wherein
the print device comprises a print server.

8. The system of claim 1 wherein
the print device comprises a printer.

9. A method comprising:
copying original system definitions of an operating system of a client device via an initiator compatible with the operating system;
altering one or more of the original copied system definitions;
generating a computing session for a print application within the operating system, where the altered original system definitions are used for the computing session while the original system definitions continue to be used for the operating system;
initiating the print application within the computing session, where the print application is operable within the generated computing session to use the altered original system definitions to facilitate communications between a print device and the client device; and
operating the print application to interface with a virtual printer of the print device to provide the print capabilities to the client device.

10. The method of claim 9, wherein the operating system of the client differs from an operating system of the print device.

11. The method of claim 9 wherein:
applications initiated in the computing session use the altered original system definitions, while applications initiated in the operating system use the original system definitions.

12. The method of claim 9 wherein:
the original system definitions comprise a registry of the operating system.

13. The method of claim 9 wherein:
the original system definitions comprise environment variables of the operating system.

14. A non-transitory computer readable medium comprising software instructions that, when executed on a processor, are operable to direct the processor to perform a method comprising:
copying original system definitions of an operating system of a client device via an initiator compatible with the operating system;
altering one or more of the copied original system definitions;
generating a computing session for a print application within the operating system, where the altered original system definitions are used for the computing session while the original system definitions continue to be used for the operating system;
initiating the print application within the computing session, where the print application is operable within the generated computing session to use the altered original system definitions to facilitate communications between a print device and the client device; and operating the print application to interface with a virtual printer of the print device to provide the print capabilities to the client device.

15. The medium of claim 14, wherein the operating system of the client differs from an operating system of the print device.

16. The medium of claim 14 wherein:
applications initiated in the computing session use the altered original system definitions, while applications initiated in the operating system use the original system definitions.

17. The medium of claim 14 wherein:
the original system definitions comprise a registry of the operating system.

* * * * *